US005838915A

United States Patent [19]
Klausmeier et al.

[11] Patent Number: 5,838,915
[45] Date of Patent: Nov. 17, 1998

[54] SYSTEM FOR BUFFERING DATA IN THE NETWORK HAVING A LINKED LIST FOR EACH OF SAID PLURALITY OF QUEUES

[75] Inventors: Daniel E. Klausmeier, Sunnyvale; Satish P. Sathe, San Mateo, both of Calif.

[73] Assignee: Cisco Technology, Inc., San Jose, Calif.

[21] Appl. No.: 972,153

[22] Filed: Nov. 17, 1997

Related U.S. Application Data

[63] Continuation of Ser. No. 493,666, Jun. 21, 1995, abandoned.
[51] Int. Cl.⁶ .................................................... G06F 13/00
[52] U.S. Cl. .............................. 395/200.45; 395/200.64; 370/412
[58] Field of Search .................................... 395/250, 872, 395/874, 876, 200.47, 200.79, 200.45, 200.64, 200.74; 370/400, 412, 403, 231, 233, 235, 417; 711/100, 167

[56] References Cited

U.S. PATENT DOCUMENTS

| 4,543,626 | 9/1985 | Bean et al. . |
| 4,894,797 | 1/1990 | Walp . |
| 4,991,172 | 2/1991 | Cidon et al. ............................ 370/400 |

(List continued on next page.)

OTHER PUBLICATIONS

C.M. Chen & N. Roussopoulos, "The Implementation and Performance Evaluation of the ADMS Query Optimizer: Integrating Query Result Caching and Matching," Lecture Notes in Computer Science, Advances in Database Technology—EDBT '94, pp. 323–336 (Cambridge, United Kingdom Mar. 1994).

"Multi–Access First–In–First–Out Queue Using 370 Compare and Swap," IBM Technical Disclosure Bulletin, vol. 36, No. 2, pp. 327–330 (Feb. 1993).

The IPX Product Family System Description, pp. 1–114 (Stratacom, Inc. 1990).

BPX Multi–Service ATM Brochure (Stratacom, Inc. 1994). Pp. 1–16.

B. Phillips, "Data Transmission and Switching," Data Communications, pp. 43–45 (McGraw Hill Jan. 1994).

*Primary Examiner*—Larry D. Donaghue
*Attorney, Agent, or Firm*—Blakely, Sokoloff, Taylor & Zafman

[57] ABSTRACT

A method and apparatus for buffering information in a digital network are provided. Each data element arrives on a particular logical connection. The apparatus stores the data element in the tail of a queue that corresponds to the connection on which the data element arrived. The apparatus maintains one queue for each connection. The apparatus tracks the state of the queues using linked lists. Each entry in the linked list corresponds to a block in the memory used to store the data. The entries that correspond to blocks that contain data for a particular connection are linked together to reflect the order of arrival of the data stored in the corresponding blocks. Information that is generated about a particular data element after the data element has been stored is placed in the linked list entry that corresponds to the block in which the data was stored, rather than in the block with the data. A connection indicator is stored with each data element to indicate the connection on which the data element is to be sent. Prior to sending a data element over a specified connection, the apparatus compares the stored connection indicator with the specified connection. If it is different from the connection indicated by the connection indicator, then an error signal is generated.

26 Claims, 9 Drawing Sheets

U.S. PATENT DOCUMENTS

| | | | |
|---|---|---|---|
| 5,083,269 | 1/1992 | Syobatake et al. | 711/100 |
| 5,121,383 | 6/1992 | Golestani | 370/235 |
| 5,136,582 | 8/1992 | Firoozmand | 370/400 |
| 5,214,639 | 5/1993 | Herion | 370/412 |
| 5,214,642 | 5/1993 | Kunimoto et al. . | |
| 5,224,099 | 6/1993 | Corbalis et al. | 370/412 |
| 5,247,626 | 9/1993 | Firoozmand | 395/200.07 |
| 5,271,002 | 12/1993 | Barri et al. | 370/359 |
| 5,278,828 | 1/1994 | Chao . | |
| 5,297,137 | 3/1994 | Ofek et al. | 370/403 |
| 5,301,192 | 4/1994 | Henrion | 711/100 |
| 5,313,454 | 5/1994 | Bustini et al. | 370/231 |
| 5,313,582 | 5/1994 | Hendel et al. | 395/250 |
| 5,314,707 | 5/1994 | Seaman et al. | 395/250 |
| 5,359,592 | 10/1994 | Corbalis et al. | 370/233 |
| 5,404,550 | 4/1995 | Horst | 395/800 |
| 5,432,908 | 7/1995 | Heddes et al. | 711/147 |
| 5,502,719 | 3/1996 | Grant et al. | 370/412 |
| 5,502,833 | 3/1996 | Byrn et al. . | |
| 5,528,587 | 6/1996 | Galand et al. | 370/60 |
| 5,557,607 | 9/1996 | Holden . | |
| 5,570,348 | 10/1996 | Holden | 370/236 |

SYSTEM FOR BUFFERING DATA IN THE NETWORK HAVING A LINKED LIST FOR EACH OF SAID PLURALITY OF QUEUES

This is a continuation of application Ser. No. 08/493,666, filed Jun. 21, 1995, now abandoned.

FIELD OF THE INVENTION

The present invention relates to a method and apparatus for handling information sent through a digital network, and more specifically, to a method and apparatus for managing queues of cells transmitted through a digital switch.

BACKGROUND OF THE INVENTION

Cell switching is a method of transmitting digital information wherein the information is broken into equal sized units called "cells." The individual cells of information are transmitted from a source node to a destination node through a "connection." A connection consists of a pathway through a digital network. A digital network is constructed of digital switches coupled together by digital communication lines.

Each cell originates at a source node and is transmitted across the communications lines. The communication lines carry the cells of information between the digital switches along the connection pathway. The digital switches route the cells from incoming communication lines to outgoing communication lines and finally to a destination node coupled to a digital switch.

Each digital switch can be connected to several communication lines. Furthermore, each communication line can carry several different connections simultaneously. Queues are used for temporarily holding cells prior to transmission on a communication line. Several queues may be used for separating different types of services and connections. For example, cells belonging to higher priority connections will be stored in queues that have a higher priority of service. In some cases, a separate queue is assigned to each connection. Serving a queue entails removing a cell from the queue and sending the cell out on a communication line or to a destination node coupled to the digital switch. A service algorithm is employed to select a queue for service. To fully utilize the bandwidth of a communication line, a cell must be selected for service during each service time.

The buffer of each digital switch must be able to store cells for each of the connections to which the switch belongs. Efficient management of the cell-storing function is crucial. For example, incoming cells must be stored at least as fast as they arrive. Furthermore, once it has been determined that cells from a particular queue should be transmitted into the digital network, the time it takes to determine where the appropriate cells are stored in the buffer, and to retrieve the cells from the buffer, should be minimal. Furthermore, while the sequence of cells that correspond to different connections may be altered during the buffering process, the cells within each connection must be transmitted in the same order as they are received with respect to each other.

SUMMARY AND OBJECTS OF THE INVENTION

One object of the invention is to provide a method and apparatus for efficiently managing cells as they flow through a digital switch.

Another object of the invention is to provide a fast and efficient mechanism for tracking and maintaining the order of the cells in each channel supported by the digital switch.

Another object of the invention is to provide an error detection mechanism for detecting when a cell management error has occurred.

An apparatus and method for buffering digital information is provided. The information includes a plurality of data elements transmitted over a plurality of logical connections. The apparatus includes a memory and a queue server.

The memory includes a plurality of blocks. The queue server contains a plurality of linked lists. The plurality of linked lists includes a linked list for each of a plurality of queues. The queue server includes a queue controller that stores each data element of the plurality of data elements.

The queue controller stores each data element by first determining the corresponding queue for the connection associated with the data element. The queue controller places the data element in a selected block in the memory. The queue controller updates the linked list that corresponds to the queue to reflect that the selected block is the last block in the queue assigned to the source connection. The source connection is the connection upon which the data element was received.

The queue controller is furthermore configured to receive a signal requesting transmission of information for a specified queue. The queue controller transmits a data element associated with the specified queue by first inspecting the linked list of the plurality of linked lists that corresponds to the specified queue to determine the block at the head of the selected queue (the "source block"). The queue controller transmits the data element that is stored in the source block. The queue controller then updates the linked list associated with the specified queue to reflect that the source block is no longer at the head of the queue.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Methods and apparatus for implementing a cell queuing control system for a digital communication system are disclosed.

A Broadband Network

Figure 1:
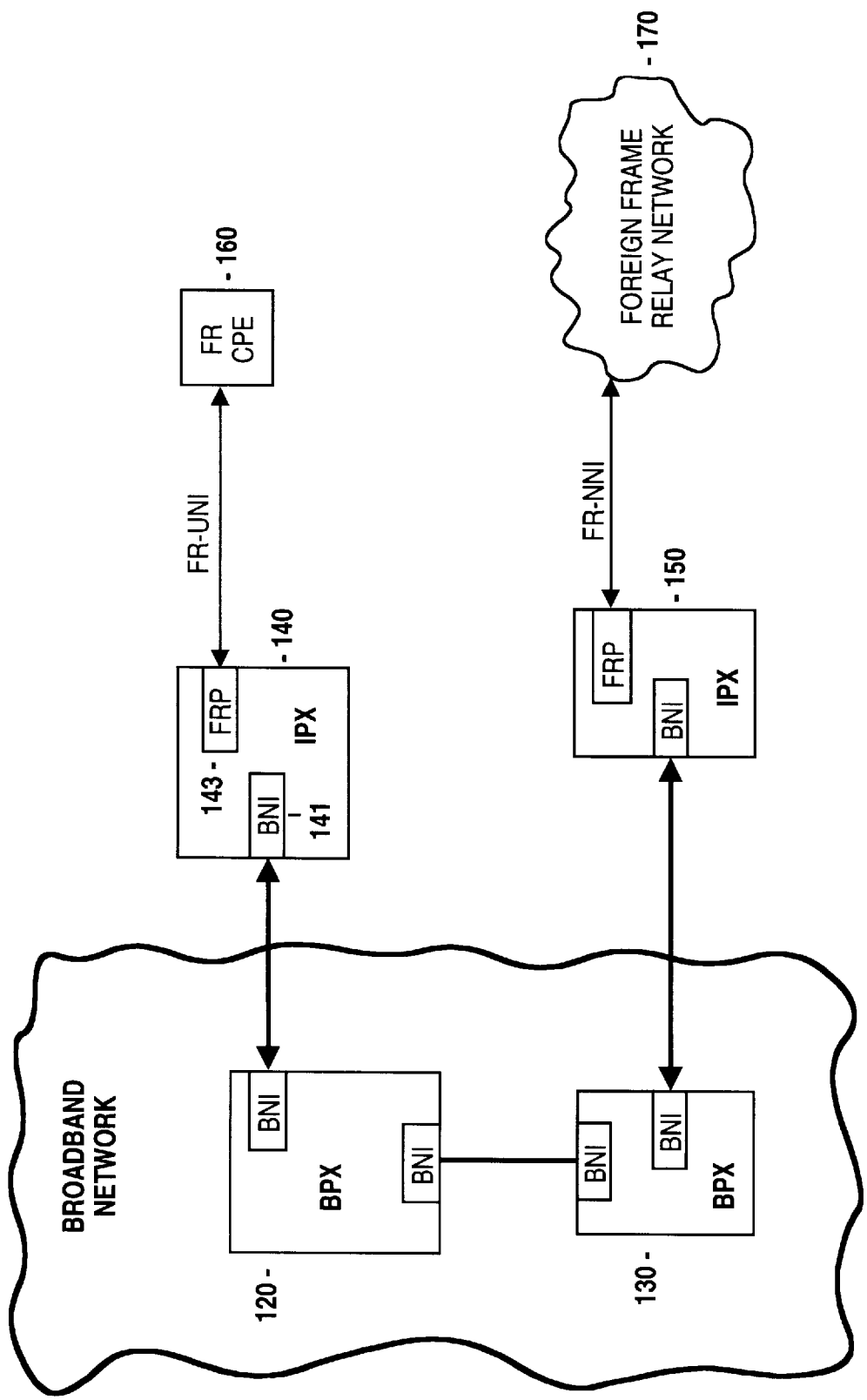
FIG. 1 illustrates a digital communication network constructed with Stratacom™ BPX™ and IPX™ digital switches.

FIG. 1 illustrates a digital communications network topology. The network illustrated in FIG. 1 is a cell switched digital communication network constructed of Broadband Packet Exchanger (BPX™) modules and Integrated Packet Exchanger (IPX™) modules sold by Stratacom of San Jose, Calif. The Stratacom BPX™ modules and the Stratacom IPX™ modules function as digital switches that are capable of building virtual circuits for routing cells. The Stratacom BPX™ modules serve as the backbone for a broadband digital Wide Area Network (WAN). The Stratacom IPX™ modules couple smaller narrowband digital communication links to the broadband digital network.

Each BPX™ module is a digital switch coupled to one or more broadband digital communication lines. Examples of broadband digital communication lines include E3 lines, T3 lines, and OC3 lines. The BPX™ digital switches are also coupled to IPX™ digital switches using broadband digital communication links.

Each IPX™ digital switch in FIG. 1 is used to couple slower digital communication lines to the broadband digital communication network. The customer premise equipment 160 may consist of any type of digital communication equipment such a Private Branch Exchange (PBX) or a packet router.

Figure 2:
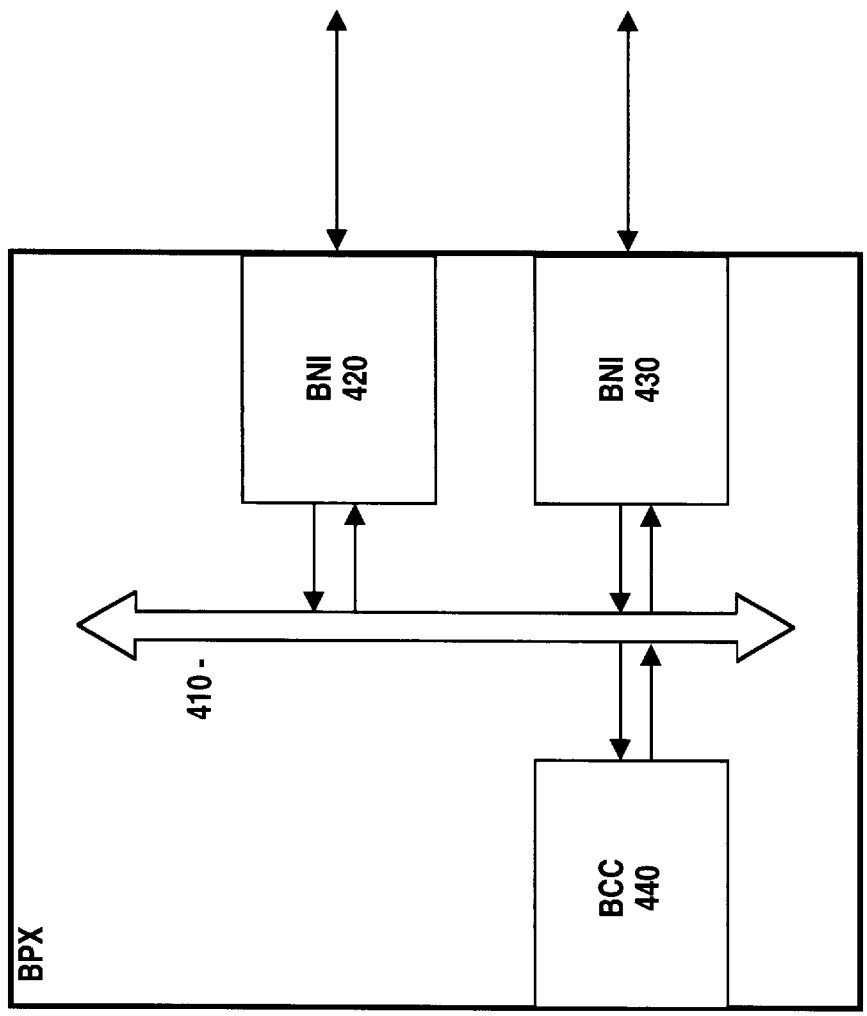
FIG. 2 illustrates an internal block diagram of a Stratacom™ BPX™ digital switch.

FIG. 2 illustrates a block diagram of the internal mechanisms of a BPX™ digital switch. Each BPX™ digital switch consists of a plurality of Broadband Network Interface (BNI) units (BNI 420 and BNI 430) and a BPX Control Card (BCC) unit 440.

Each Broadband Network Interface (BNI) unit consists of a network interface connected to a broadband digital communication line. Every Broadband Network Interface unit is also coupled to a high-speed backplane bus 410 within the BPX™ digital switch. In the present embodiment the backplane bus 410 of the BPX™ comprises the Stratabus™.

The BCC unit 440 is also coupled to the backplane bus 410. The BCC unit 440 functions as a digital crossbar switch that routes data cells to and from all the different digital communication lines that are coupled to the BPX™ digital switch.

A Broadband Network with the ATM Service Interface

Figure 3:
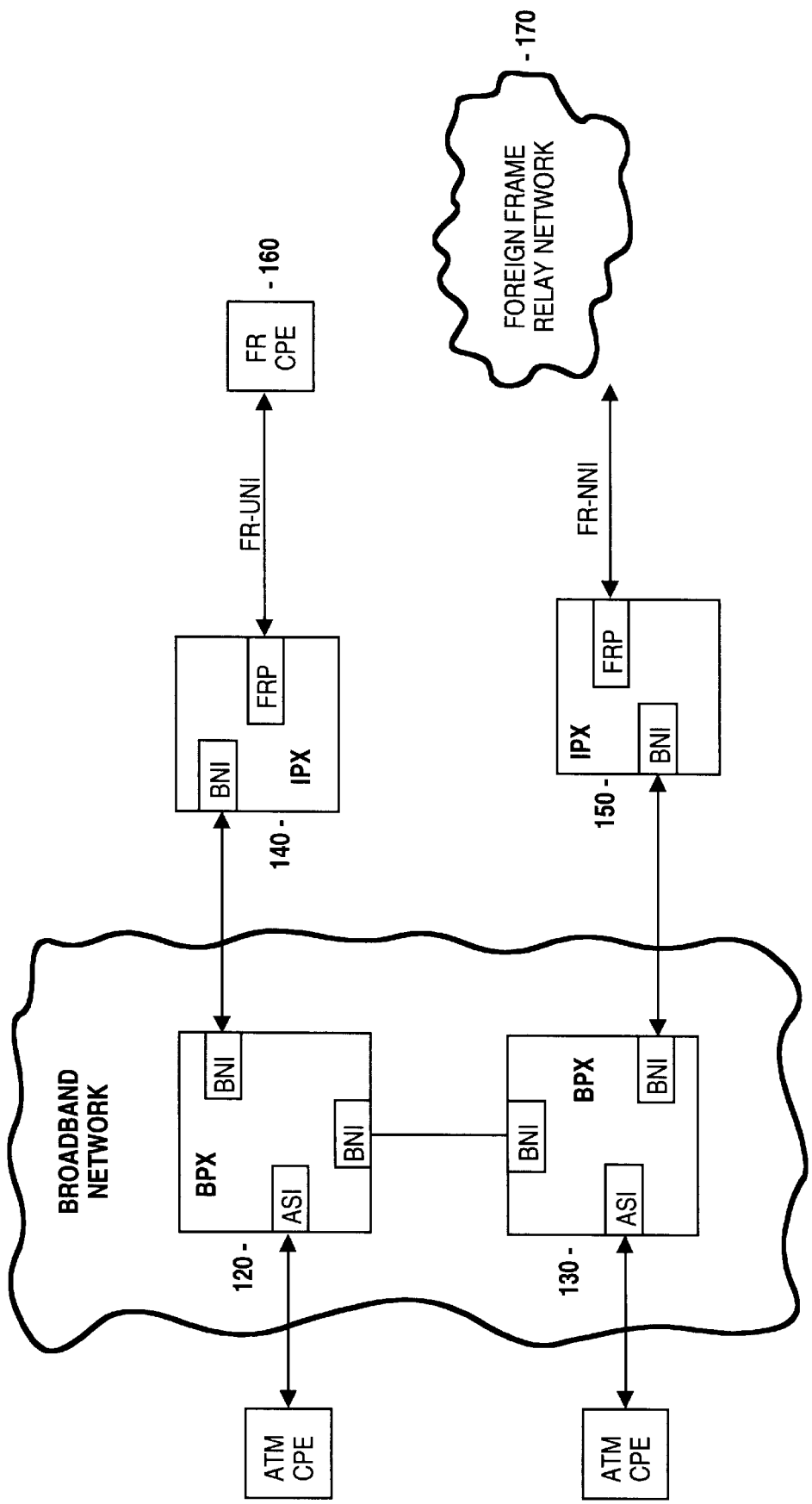
FIG. 3 illustrates a digital communication network constructed with Stratacom BPX™ and IPX™ switches wherein the Stratacom BPX™ switches have ATM Service Interface (ASI) cards.

FIG. 3 illustrates a broadband network. In the network diagram of FIG. 3 each BPX™ digital switch includes an Asynchronous Transfer Mode (ATM) Service Interface card (ASI). The ATM service interface (ASI) cards in each BPX™ digital switch can be used to directly connect a BPX™ digital switch to any customer premise equipment that uses asynchronous transfer mode (ATM) communications and supports the proper interface. In the present embodiment, a T3 based communication link is used to carry the information.

Figure 4:
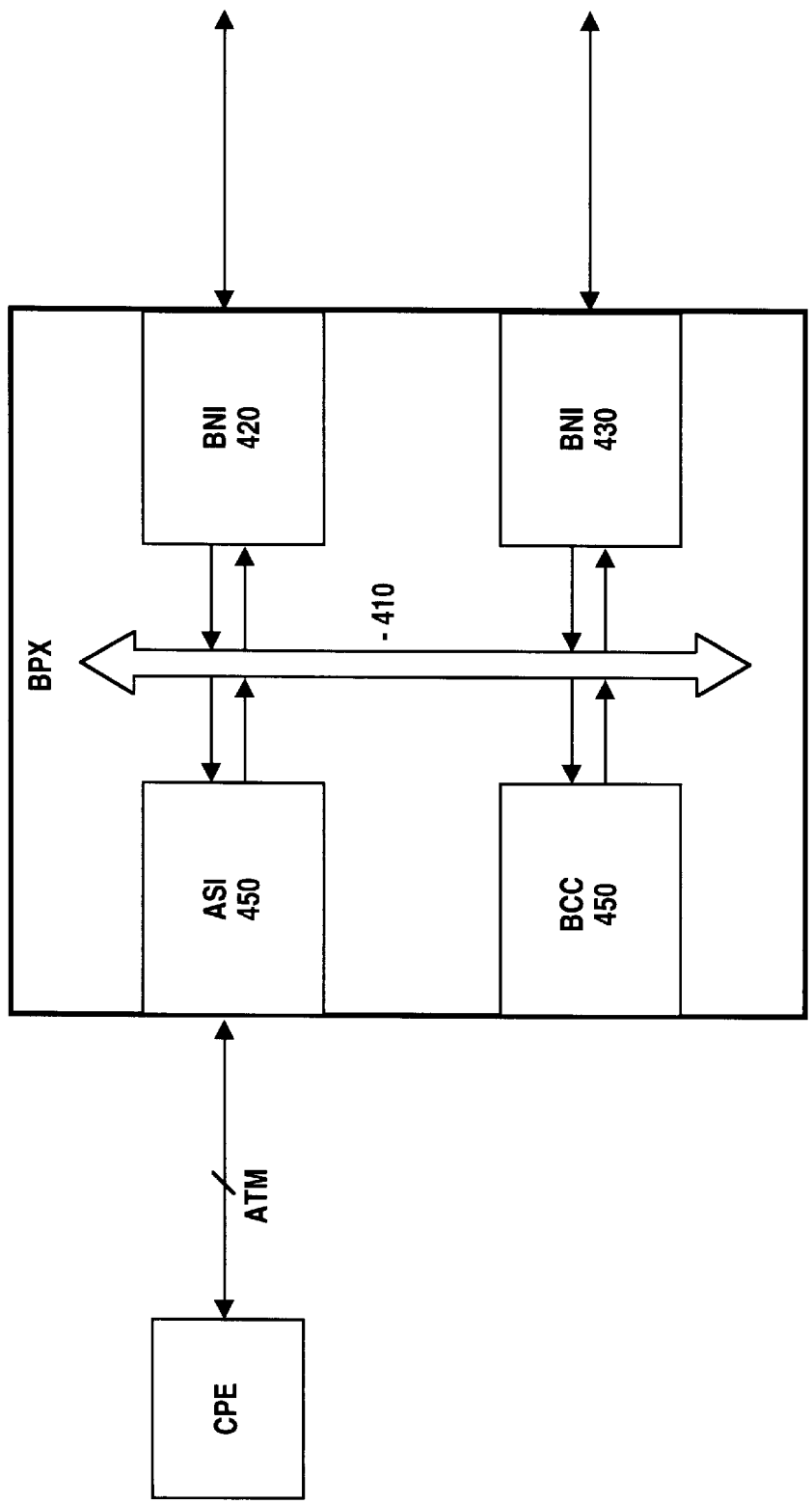
FIG. 4 illustrates an internal block diagram of a Stratacom BPX™ digital switch with an ATM Service Interface (ASI) card.

FIG. 4 illustrates an internal block diagram of a BPX™ digital switch with an ATM service interface (ASI) card 450 installed. Customer premise equipment (CPE) can be coupled directly to the ASI card using an asynchronous transfer mode (ATM) communications link. Within the BPX™ switch, the ATM service interface (ASI) card 450 is coupled to the BCC crosspoint switch 440 via the high-speed Stratabus™ 410 on the BPX™ backplane. In this manner, the information from the Customer premise equipment transmitted across the asynchronous transfer mode communications link can be switched to other communication links coupled to the BPX™ digital switch.

The ATM Service Interface Card

Figure 5:
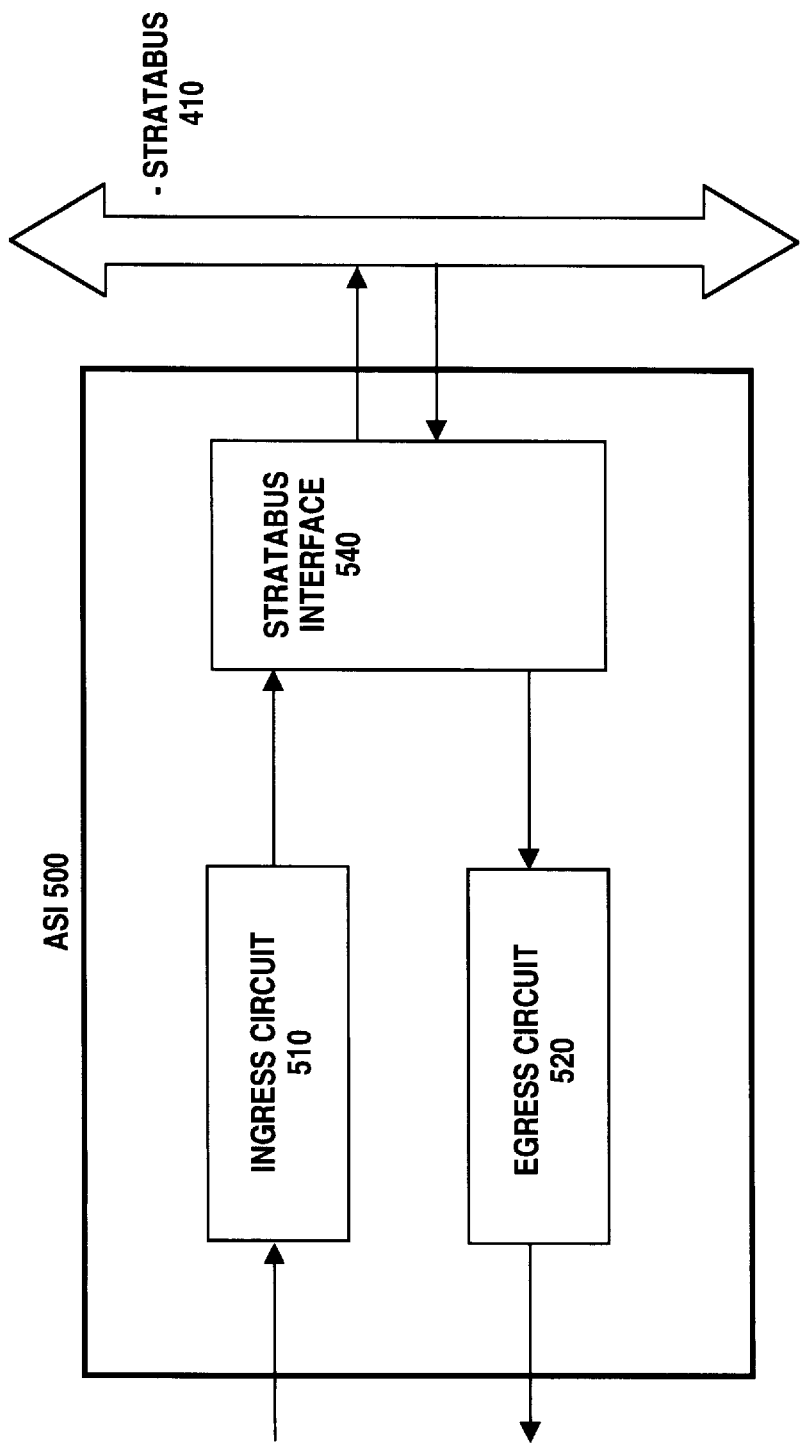
FIG. 5 illustrates an internal block diagram of an ATM Service Interface (ASI) card.

FIG. 5 illustrates an internal block diagram of an ATM service interface (ASI) card 500. The ATM service interface (ASI) card 500 comprises an ingress circuit 510, an egress circuit 520 and a Stratabus™ interface circuit 540. The ingress circuit 510 is connected to a communications line that uses asynchronous transfer mode (ATM) protocol. The ingress circuit 510 processes incoming data cells received from the communications line. The egress circuit 520 is also connected to the communications line and processes outgoing data cells. The Stratabus™ interface circuit 540 is coupled to both the ingress circuit 510 and the egress circuit 520 and distributes data cells to the Stratabus™ 410 within the BPX™ digital switch.

Figure 6:
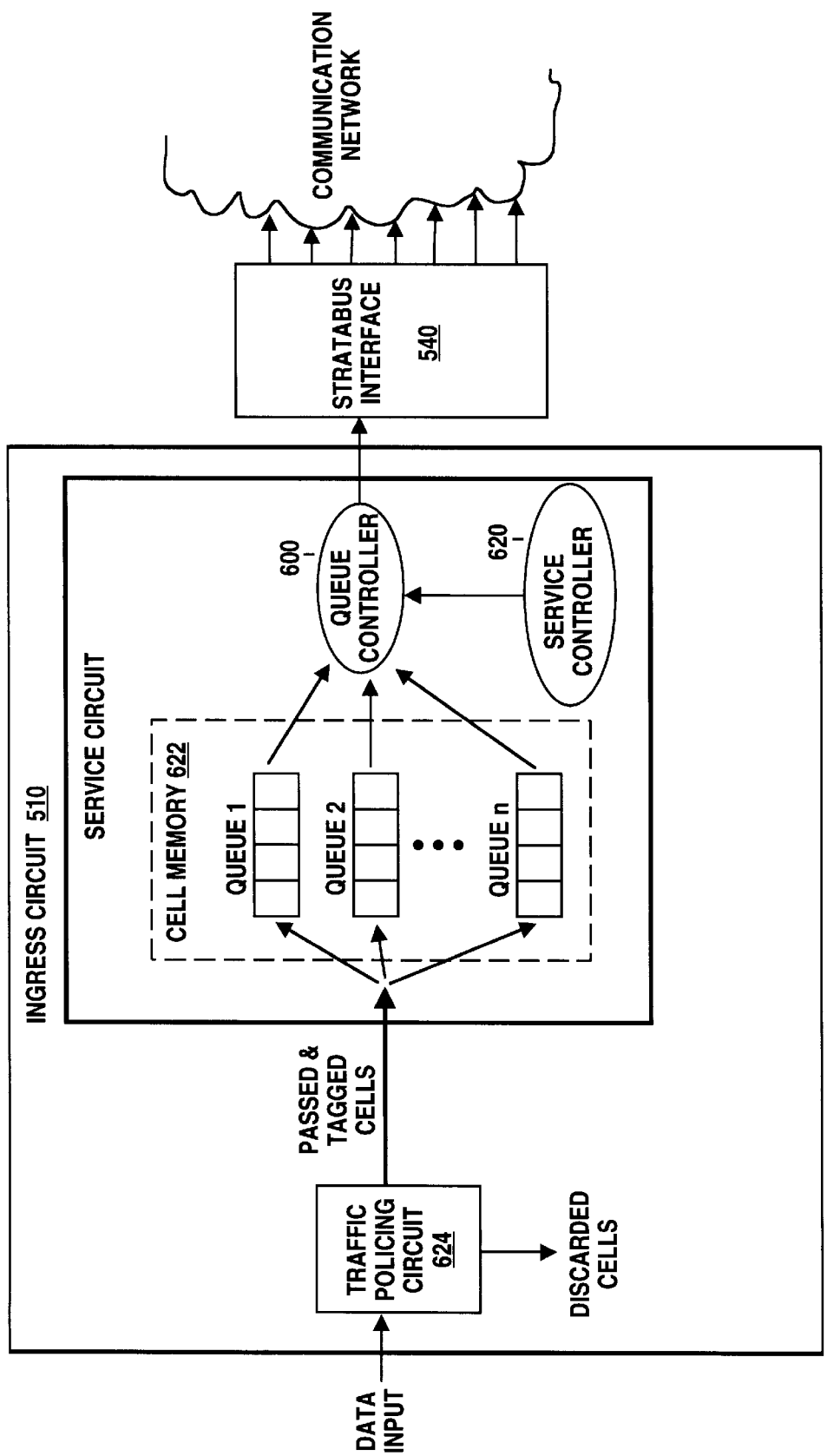
FIG. 6 illustrates an internal block diagram of the ingress circuit in an ATM Service Interface (ASI) card.

FIG. 6 illustrates an internal block diagram of the ingress circuit 510. At the left of FIG. 6 is a Traffic Policing circuit 624. The Traffic Policing circuit 624 monitors the rate of incoming data cells and determines if the incoming data cells are exceeding the allowed data rate.

After passing through the Traffic Policing circuit 624, each data cell is placed into a queue in a cell memory 622 until the data cell is served. In the preferred embodiment, the data cells have a uniform size. Consequently, the blocks in cell memory 622 used to store the cells may also be of uniform size.

According to one embodiment of the invention, each connection has an associated queue. All of the connection queues are serviced by a queue server in a queue controller 600. Incoming cells are stored at the tail end of the queue that corresponds to the cell's connection. The queue server retrieves each outgoing cell from the head of the queue that corresponds to the cell's connection.

A service controller 620 is coupled to the queue controller 600 and controls the queue server within queue controller 600. The service controller 620 determines when each queue will be served. Specifically, when service controller 620 determines that a particular connection should be served, service controller 620 transmits a signal to the queue server to indicate a connection. In response to the signal from service controller 620, the queue server retrieves the cell from the head of the queue corresponding to the indicated connection and causes the cell to be transmitted over stratabus interface circuit 540.

The Queue Controller

As explained above, cell memory 622 includes one queue for each connection. These queues may be implemented through special memory components, such as FIFOs. However, such an implementation would be expensive and inflexible. For example, a cell memory 622 that supports a thousand connections would require a thousand separate queue-implementing memory components. Furthermore, it would be difficult for queues that correspond to connections with heavy traffic to "borrow" memory from queues that correspond to connections with light or no traffic. Consequently, the present embodiment stores incoming cells in dynamic random access memory, and implements queues through the use of linked lists.

Figure 7:
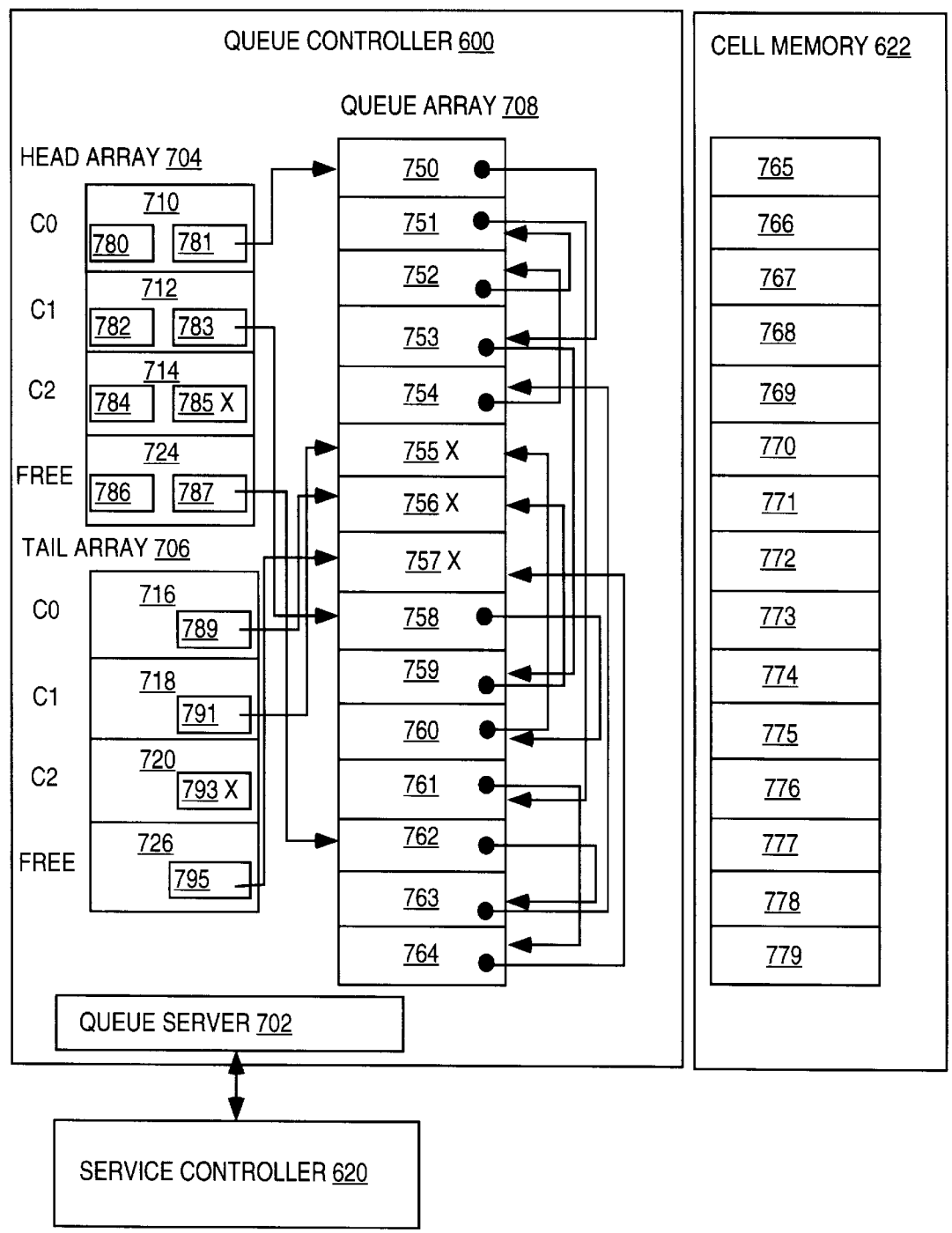
FIG. 7 illustrates an internal block diagram of a queue server according to an embodiment of the present invention.

FIG. 7 illustrates a block diagram of queue controller 600 according to one embodiment of the present invention. For the purposes of explanation, it shall be assumed that ASI card 500 supports three connections: a connection 0, connection 1 and connection 2. While a three-connection ASI card is illustrated, the present invention is not limited to any particular number of connections. Thus, a single ASI card may support thousands of connections.

Queue controller 600 generally includes a queue server 702, a head array 704, a tail array 706 and a queue array 708. Queue server 702 keeps track of the location and sequence of the cells stored in cell memory 622 for each of connections 0, 1 and 2 through the use of linked lists. Each connection has a corresponding linked list. Head array 704, tail array 706 and queue array 708 are used by queue server 702 to implement the linked lists.

The Queue Array

There is a one to one correspondence between the entries 750–764 in queue array 708 and the memory blocks 765–779 located in cell memory 622. For example, entry 750 corresponds to block 765 of cell memory 622, entry 751 corresponds to block 766 of cell memory 622, etc. Each entry in queue array 708 contains a pointer which indicates a "next entry" in queue array 708. Each sequence of queue array entries that are linked together via "next entry" pointers constitutes a linked list. In the illustrated example, entries 750, 753, 759, and 756 are linked together to form a linked list. Entry 756 is illustrated with an "X" rather than a pointer to indicate that the value of its pointer is irrelevant because it is the last entry in the linked list.

Each connection supported by queue controller 600 has a corresponding linked list in queue array 708. Queue server 702 maintains the links in queue array 708 so that entries in the linked list associated with a given connection correspond to the location of cells received for that given connection. For example, assume that the linked list comprising entries 750, 753, 759, and 756 corresponds to connection 0. This would indicate that blocks 765, 768, 774 and 771, which correspond to entries 750, 753, 759, and 756, contain cells that were received on and are to be sent over connection 0.

Furthermore, the order of entries in each linked list in queue array 708 that is associated with a given connection indicates the order in which the cells in the corresponding blocks were received. Thus, the linked list comprising entries 750, 753, 759, and 756 not only identifies the blocks that store the cells associated with connection 0, but it furthermore indicates that the cell in block 765 was received before the cell in block 768, that the cell in block 768 was received before the cell in block 771, etc. Consequently, by inspecting the linked list comprising entries 750, 753, 759, and 756, it may be determined that the cells associated with connection 0 were stored, sequentially, in blocks 765, 768, 774 and 771 of cell memory 622.

The Head and Tail Arrays

Both head array 704 and tail array 706 contain one record for each connection supported by ASI card 500. Specifically, head array 704 includes head records 710, 712 and 714 which correspond to connections 0, 1 and 2, respectively. Similarly, tail array 706 contains tail records 716, 718, and 720 which correspond to connections 0, 1 and 2, respectively. Each of the entries in head array 704 and tail array 706 contain a pointer. The records in head array 708 also contain an "empty" flag. Specifically, head records 710, 712, 714 and 724 of head array 704 respectively contain pointers 781, 783, 785 and 787, and empty flags 780, 782, 784 and 786. Tail records 716, 718, 720 and 726 of tail array 706 respectively contain pointers 789, 791, 793 and 795.

The pointers contained in the head records in head array 704 and the tail records in tail array 706 point to entries of queue array 708. The head record in head array 704 for a given connection contains a pointer to the head (oldest entry) of the linked list in queue array 708 associated with the connection. The tail record in tail array 706 for a given connection contains a pointer to the tail (most recent entry) of the linked list in queue array 708 for the connection. For example, the entry at the head of the linked list associated with connection 0 (i.e. entry 750) is pointed to by the pointer 781 of the head record in head array 704 that corresponds to connection 0 (i.e. head record 710). Similarly, the entry at the tail of the linked list associated with connection 0 (i.e. entry 756) is pointed to by the pointer 789 of the tail record in tail array 706 that corresponds to connection 0 (i.e. tail record 716).

Free Block List

Queue controller 600 also keeps track of the blocks within cell memory 622 that are available for storing new cells. Consequently, in addition to having a linked list for every connection, queue array 708 contains a linked list that indicates the free blocks in cell memory 622. In addition to containing one record for each of connections 0, 1 and 2, head array 704 and tail array 706 each have one record for keeping track of the free blocks in cell memory 622. In the illustrated example, head record 724 in head array 704 and tail record 726 in tail array 706 are provided to track the linked list in queue array 708 that is associated with the free blocks in cell memory 622.

Linked List Maintenance

As explained above, queue server 702 maintains head array 704, tail array 706 and queue array 708 to keep track of the location of the cells that are stored within cell memory 622 that are associated with each connection, and to keep track of the sequence in which they arrived relative to the other cells associated with the same connection. In order for head array 704, tail array 706 and queue array 708 to reflect the current state of cell memory 622, queue server 702 must be informed every time a cell is stored in cell memory 622 and every time a cell is to be transmitted from cell memory 622. The various maintenance procedures performed by queue server 702 shall now be described in greater detail with reference to FIGS. 8 and 9.

Receiving A Cell

Figure 8:
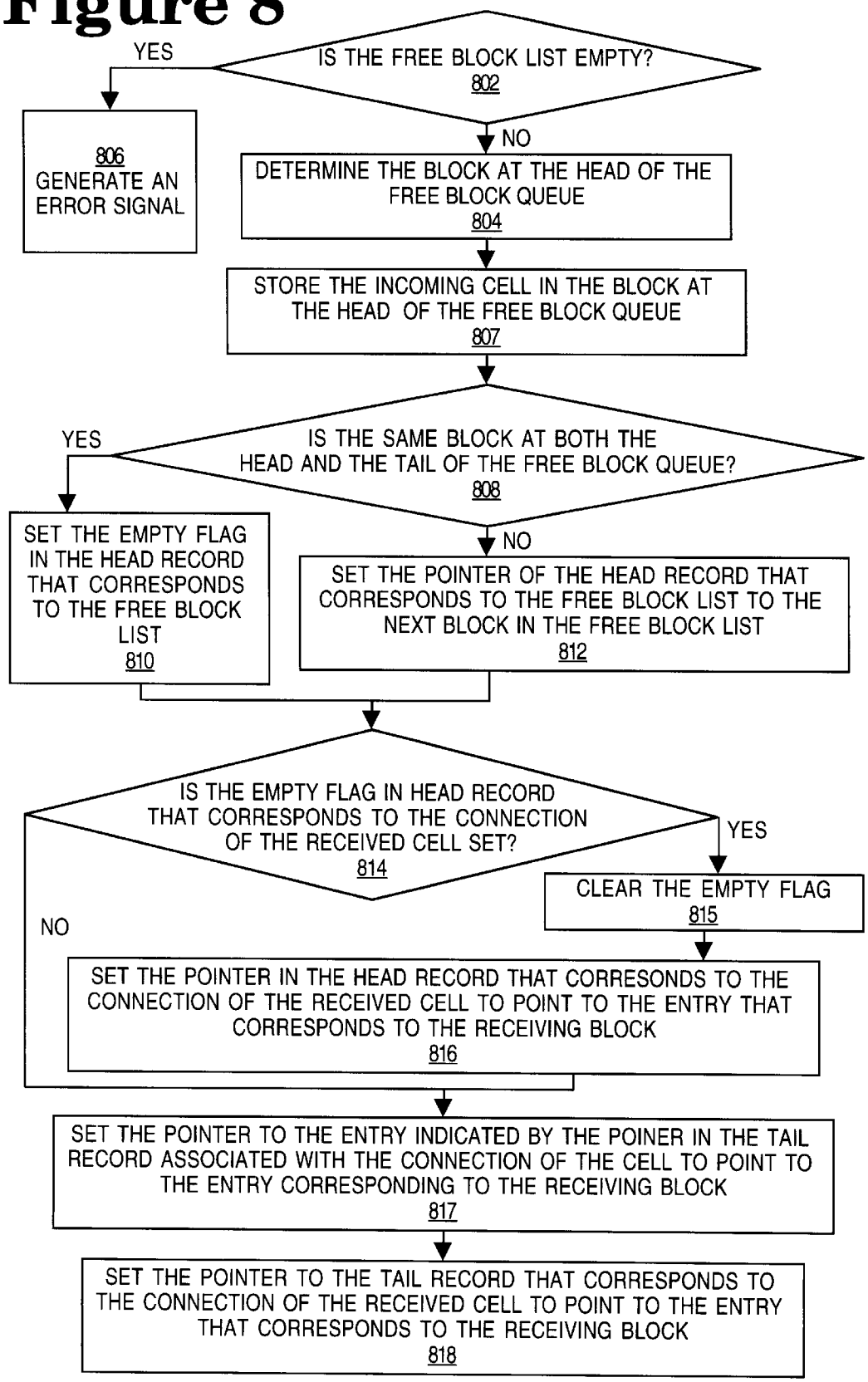
FIG. 8 is a flow chart illustrating steps for storing incoming cells in the appropriate queue.

FIG. 8 is a flowchart illustrating the steps performed by queue server 702 to store a cell in cell memory 622. For the purposes of explanation, it shall be assumed that queue controller 600 initially begins in the state illustrated in FIG. 7. In the illustrated state, the linked list associated with connection 0 includes entries 750, 753, 759, and 756, in that order. Thus, the queue for connection 0 includes blocks 765, 768, 774, and 771, in that order. The linked list associated with connection 1 includes entries 758, 760, and 755, in that order. The queue for connection 1 therefore includes blocks 773, 775 and 770, in that order. The linked list associated with connection 2 includes no entries, which indicates that no cells associated with connection 2 are currently stored in cell memory 622. The free block linked list, which identifies the blocks in cell memory 622 that are not currently storing cells, includes entries 762, 763, 754, 752, 751, 761, 764 and 757, in that order. The free block queue therefore includes blocks 777, 778, 769, 767, 766, 776, 779 and 772, in that order.

In general, receiving a cell consists of removing a block from the head of the free block queue, storing the cell in the block, and adding the block to the tail of the queue that corresponds to the connection associated with the received cell. Queue server 702 performs this process in response to a signal that indicates the arrival of the new cell and identifies the connection with which the new cell is associated.

Checking for an Empty List Condition

At step 802, queue server 702 determines whether the linked list associated with the free memory blocks (the "free block list") is empty. Preferably, this step is performed by inspecting an "empty" flag located in the head record of head array 704 that is associated with the free block list. In the example shown in FIG. 7, head record 724 is the head record of head array 704 that is associated with the free block list. Therefore, queue server 702 inspects an "empty" flag 786 in head record 724 to determine whether the free block list is empty.

This step assumes that the empty flag 786 accurately reflects whether the free block list is empty. To ensure that the empty flags accurately reflect the state of the lists, the empty flags must be set and cleared at the appropriate times. Specifically, the empty flag associated with a list must be set when the last entry is removed from the list, and the empty flag associated with a list must be cleared when an entry is added to an empty list. The steps of setting and clearing the empty flags is described in greater detail below with reference to steps 810 and 815.

In the illustrated example, the free block list includes entries 762, 763, 754, 752, 751, 761, 764 and 757. Because the free block list is not empty, the empty flag 786 in head record 724 would not be set. Therefore, control passes to step 804. Otherwise, if the free block list is empty, an error signal is generated at step 806.

Storing the Incoming Cell

At step 804, queue server 702 determines which memory block of cell memory 622 is at the head of the free block queue. Preferably, this is performed by inspecting the pointer of the head record associated with the free block list (head record 724). In the illustrated example, the pointer 787 of the head record 724 associated with the free block list points to entry 762. Therefore, block 777, which corresponds to entry 762, is the block at the head of the free block queue.

At step 807, the incoming cell is stored in the block in cell memory 622 at the head of the free block queue (the "receiving block"). In the illustrated example, block 777 is the receiving block. Once the cell has been stored in the receiving block, queue server 702 must perform two queue management tasks. First, the receiving block must be removed from the free block queue. Second, the receiving block must be added to the tail of the queue that corresponds to the connection associated with the cell.

Removing the Receiving Block from the Free Block Queue

Steps 808, 810 and 812 relate to the task of removing the receiving block from the free block queue. At step 808, queue server 702 determines whether the pointers 787 and 795 in the head record 724 and tail record 726 that are associated with the free block list point to the same entry in queue array 708. These pointers would point to the same entry if and only if the receiving block was the only block in the free block queue. If the pointers 787 and 795 in the head record 724 and tail record 726 that are associated with the free block list do not point to the same entry in queue array 708, then the free block queue contains at least one other block in addition to the receiving block.

If the free block queue contains only the receiving block, then the removal of the receiving block from the free block queue would cause the free block list to become empty. Under these conditions, the queue server 702 sets the empty flag 786 in the head record 724 associated with the free block list to indicate that the free block list is empty, as shown at step 810.

In the illustrated example, the pointer 787 of the head record 724 of the free block list points to entry 762. The pointer 795 of the tail record 726 of the free block list points to entry 757. Because the pointers do not point to the same entry, the free block queue contains at least one block in addition to the receiving block, and control will pass to step 812.

At step 812, the pointer 787 in the head record 724 of the free block list is updated to point to the next entry in the free block list. The "next entry" refers to the entry that follows the entry that corresponds to the receiving block. This entry is identified by inspecting the "next entry" pointer of the entry that corresponds to the receiving block.

In the illustrated example, block 777 is the receiving block. The entry that corresponds to block 777 is entry 762. The entry that follows entry 762 in the free block list is identified by the pointer contained in entry 762. The pointer contained in entry 762 indicates that entry 763 follows entry 762 in the free block list. Therefore, at step 812, the pointer 787 of head record 724 is updated to point to entry 763.

At the conclusion of steps 808, 810 and 812, the pointer 787 in the head record 724 corresponding to the free block list points to entry 763 and the pointer 795 of the tail record 726 that corresponds to the free block list points to entry 757. The free block list includes entries 763, 754, 752, 751, 761, 764 and 757. Therefore, the free block queue contains blocks 778, 769, 767, 766, 776, 779 and 772. Block 777, which received the cell, has been removed from the free block queue.

Adding the Receiving Block to the Appropriate Queue

Steps 814, 815, 816, 817 and 818 relate to the task of adding the receiving block to the tail of the queue that corresponds to the connection associated with the cell. For the purposes of explanation, it shall be assumed that the received cell was associated with connection 1.

At step 814, queue server 702 determines whether the empty flag in head record that corresponds to the connection of the received cell is set. If the empty flag is not set, control passes to step 817. If the empty flag is set, control passes to step 815.

In the present example, the received cell was associated with connection 1. Head record 712 of head array 704 is the head record associated with connection 1. Therefore, at step 814, queue server 702 determines whether the empty flag 782 in head record 712 is set. In the present example, the empty flag 782 would not be set, because the linked list associated with connection 1 is not empty. If the empty flag had been set, queue server 702 would clear the empty flag (step 815) and set the pointer 783 in the head record 712 that corresponds to the connection of the received cell to point to the entry 762 that corresponds to the receiving block 777 (step 816).

At step 817, queue server 702 sets the pointer of the queue array entry indicated by the pointer in the tail record associated with the connection of the cell to point to the queue array entry corresponding to the receiving block. In the present example, the tail record associated with the connection 1 is tail record 718 of tail array 706. The queue array entry indicated by the pointer 791 of tail record 718 is entry 755. The queue array entry corresponding to the receiving block is entry 762. Therefore, at step 816, queue server 702 sets the pointer of entry 755 to point to entry 762.

At step 818, queue server 702 sets the pointer of the tail record that corresponds to the connection of the received cell to point to the entry in queue array 708 that corresponds to the receiving block. In the present example, tail record 718 corresponds to connection 1. Entry 762 is the entry in queue array 708 that corresponds to the receiving block (block 777). Therefore, at step 818, queue server 702 sets the pointer 791 of tail record 718 to point to entry 762.

After steps 814, 815, 816, 817 and 818 have been performed, the linked list associated with connection 1 includes entries 758, 760, 755 and 762. The pointer 783 of the head record 712 associated with connection 1 points to entry 758. The pointer 791 of tail record 718 points to entry 762. Thus, the entry 762 of queue array 708 that corresponds to the receiving block 777 has been effectively added to the tail of the linked list associated with connection 1.

Transmitting A Cell

Figure 9:
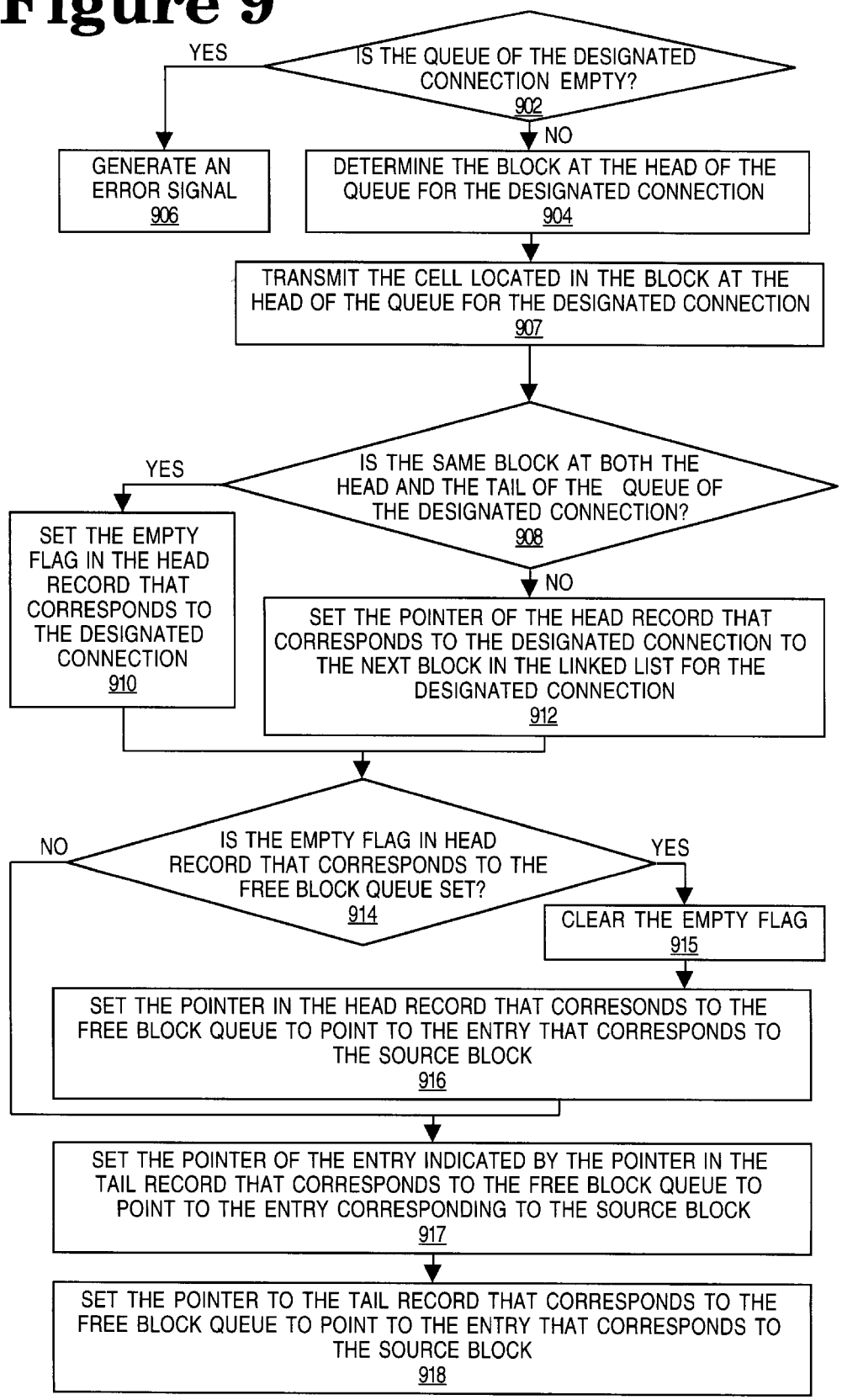
FIG. 9 is a flow chart illustrating steps for transmitting stored cells in response to a signal to send information out on a designated connection.

FIG. 9 is a flowchart illustrating the steps performed by queue server 702 to transmit a cell that is stored in cell memory 622. For the purposes of explanation, it shall be assumed that queue controller 600 initially begins in the state illustrated in FIG. 7.

In general, transmitting a cell of a given connection consists of sending the cell that is stored in the block that resides at the head of the queue for the connection, removing the block from the head of the queue for the connection, and adding the block to the tail of the free list queue. Queue server 702 initiates this process in response to a signal from service controller 620 that identifies the connection onto which a cell is to be transmitted (the "designated connection"). For the purposes of explanation, it shall be assumed that queue server 702 has received from service controller 620 a signal designating connection 0.

Error Checking

At step 902, queue server 702 determines whether the linked list associated with the designated connection is empty. Preferably, this step is performed by inspecting an "empty" flag located in the head record of head array 704 that is associated with the designated connection. In the example shown in FIG. 7, head record 710 is the head record of head array 704 that is associated with the designated connection. Therefore, queue server 702 inspects an "empty" flag 780 in head record 710 to determine whether the linked list that corresponds to the designated connection is empty.

In the illustrated example, the linked list that corresponds to the designated connection includes entries 750, 753, 759 and 756. Because the linked list that corresponds to the designated connection is not empty, control passes to step 904. Otherwise, if the linked list that corresponds to the designated connection is empty, an error signal is generated at step 906.

Transmitting the Cell

At step 904, queue server 702 determines which memory block of cell memory 622 is at the head of the queue for the designated connection. Preferably, this is performed by inspecting the pointer 781 of the head record associated with the designated connection (head record 710). In the illustrated example, the pointer 781 of the head record 710 associated with the designated connection points to entry 750. Therefore, block 765, which corresponds to entry 750, is the block at the head of the queue for the designated connection.

At step 907, the cell that is stored in the block in cell memory 622 at the head of the queue for the designated connection (the "source block") is transmitted. In the illustrated example, block 765 is the source block. Once the cell has been transmitted from the source block, queue server 702 must perform two queue management tasks. First, the source block must be removed from the queue for the designated connection. Second, the source block must be added to the tail of the free block queue.

Removing the Source Block from the Queue for the Designated Connection

Steps 908, 910 and 912 relate to the task of removing the source block from the queue for the designated connection. At step 908, queue server 702 determines whether the pointers 781 and 789 in the head record 710 and tail record 716 that are associated with the designated connection point to the same entry in queue array 708. These pointers would point to the same entry if and only if the source block was the only block in the queue for the designated connection. If the pointers 781 and 789 in the head record 710 and tail record 716 that are associated with the designated connection do not point to the same entry in queue array 708, then the queue for the designated connection contains at least one other block in addition to the source block.

If the queue for the designated connection contains only the source block, then the removal of the source block from the queue for the designated connection would cause the linked list that corresponds to the designated connection to become empty. Under these conditions, the queue server 702 sets the empty flag 780 in the head record 710 associated with the designated connection to indicate that the linked list that corresponds to the designated connection is empty, as shown at step 910.

In the illustrated example, the pointer 781 of the head record 710 that corresponds to the designated connection points to entry 750. The pointer 789 of the tail record 716 that corresponds to the designated connection points to entry 756. Because the pointers do not point to the same entry, the queue for the designated connection contains at least one block in addition to the source block, and control will pass to step 912.

At step 912, the pointer 781 in the head record 710 that corresponds to the designated connection is updated to point to the next entry in the linked list that corresponds to the designated connection. The "next entry" refers to the entry that follows the entry that corresponds to the source block. This entry is identified by inspecting the "next entry" pointer of the entry that corresponds to the source block.

In the illustrated example, block 765 is the source block. The entry that corresponds to block 765 is entry 750. The entry that follows entry 750 in the linked list that corresponds to the designated connection is identified by the pointer contained in entry 750. The pointer contained in entry 750 indicates that entry 753 follows entry 750 in the linked list that corresponds to the designated connection. Therefore, at step 912, the pointer 781 of head record 710 is updated to point to entry 753.

At the conclusion of steps 908, 910 and 912, the pointer 781 in the head record 710 corresponding to the designated connection points to entry 753 and the pointer 789 of the tail record 716 that corresponds to the designated connection points to entry 756. The linked list that corresponds to the designated connection includes entries 753, 759 and 756. Therefore, the queue for the designated connection contains blocks 768, 774 and 771. Block 765, from which the cell was transmitted, has been removed from the queue for the designated connection.

Adding the Source Block to the Free Block Queue

Steps 914, 915, 916, 917 and 918 relate to the task of adding the source block to the tail of the free block queue. At step 914, queue server 702 determines whether the empty flag in head record that corresponds to the free block queue is set. If the empty flag is not set, control passes to step 917. If the empty flag is set, control passes to step 915.

In the present example, head record 710 of head array 704 is the head record associated with the free block queue. Therefore, at step 914, queue server 702 determines whether the empty flag 780 in head record 710 is set. In the present example, the empty flag 780 would not be set, because the linked list associated with the free block queue is not empty. If the empty flag had been set, queue server 702 would clear the empty flag (step 915) and set the pointer 781 in the head record 710 that corresponds to the free block queue to point to the entry 750 that corresponds to the source block 765.

At step 917, queue server 702 sets the pointer of the queue array entry indicated by the pointer in the tail record associated with the free block queue to point to the queue array entry corresponding to the source block. In the present example, the tail record associated with the free block queue is tail record 726 of tail array 706. The queue array entry indicated by the pointer 795 of tail record 726 is entry 757. The queue array entry corresponding to the source block is entry 750. Therefore, at step 916, queue server 702 sets the pointer of entry 757 to point to entry 750.

At step 916, queue server 702 sets the pointer of the queue array entry indicated by the pointer in the tail record that corresponds to the free block queue to point to the queue array entry that corresponds to the source block. In the present example, the tail record associated with the free block queue is tail record 726 of tail array 706. The queue array entry indicated by the pointer 795 of tail record 726 is entry 757. The queue array entry corresponding to the source block is entry 750. Therefore, at step 916, queue server 702 sets the pointer of entry 757 to point to entry 750.

At step 918, queue server 702 sets the pointer of the tail record that corresponds to the free block queue to point to the entry in queue array 708 that corresponds to the source block. In the present example, tail record 726 corresponds to the free block queue. Entry 750 is the entry in queue array 708 that corresponds to the source block (block 765). Therefore, at step 918, queue server 702 sets the pointer 795 of tail record 726 to point to entry 750.

After steps 914, 916 and 918 have been performed, the linked list associated with the free block queue includes entries 762, 763, 754, 752, 751, 761, 764, and 750. The pointer 787 of the head record 724 associated with the free block queue points to entry 762. The pointer 795 of tail record 726 points to entry 750. Thus, the entry 750 of queue array 708 that corresponds to the source block 765 has been effectively added to the tail of the linked list associated with the free block queue.

Cell Time

Cell time is the amount of time required for an entire cell to arrive. To keep up with incoming information, queue controller 600 must be able to store one incoming cell per cell time. In one embodiment, a hardware interrupt is generated at the beginning at each cell time period. For T3 connections, the cell time period is approximately 10 microseconds.

To complete the storing process in the allocated time, queue controller 600 preferably removes a block from the head of the free block queue prior to the arrival of a cell. If no cell arrives during the cell time period, then queue controller 600 simply adds the block back to the end of the free block queue. Consequently, the free block queue will cycle during periods in which no cells are received.

It is desirable to minimize the amount of work performed by queue server 702 during each cell time. In one embodiment, the work of queue server 702 is reduced by bypassing the free block queue under certain conditions. Specifically, rather than automatically placing a block into the free block queue when the cell contained therein is transmitted, queue server 702 first determines whether there is an incoming cell that needs to be stored. If there is an incoming cell, then the incoming cell is stored in the block, and the block is appended to the appropriate queue. This avoids the need to perform the additional operations of storing the newly freed block on the tail of the free block queue and retrieving a free block from the head of the free block queue.

Queue Counters

Typically, different connections are associated with different levels of service. The queues for those connections associated with one level of service may be managed according to different rules than those connections associated with another level of service. One parameter that may vary based on the level of service is the maximum queue size for a connection.

Preferably, queue controller 600 maintains a queue counter for every connection. The queue counter for a queue indicates the number of blocks currently assigned to the queue. When a block is added to a queue, queue server 702 increments the queue counter for the queue. When a block is removed from a queue, queue server 702 decrements the counter for the queue.

Traffic Policing Circuit 624 may be configured to discard cells based on the current size of the queue and the priority of the incoming cells. For example, if the size of a queue is beyond a certain threshold, the Traffic Policing Circuit 624 may discard low priority cells that arrive on the connection associated with the queue. If a queue is at a maximum allowed queue size, the Traffic Policing Circuit 624 may discard all cells that arrive on the connection associated with the queue.

The queue counters can also be used to detect when linked lists become corrupted. Specifically, a queue is determined to be empty when the last entry is removed from the corresponding linked list. An entry is determined to be the last entry if the head and tail pointers of the linked list both point to the entry. When a queue is determined to be empty by this method, the queue counter is inspected. If the queue counter contains a non-zero value, then an error has occurred. An error signal is generated to indicate the occurrence of an error.

Error Detection

A hardware error could corrupt one or more pointers in queue controller 600. For example, an error could cause entry 750 of queue array 708 to point to entry 760 rather than entry 753. This would cause the linked list associated with connection 0 to change from entries 750, 753, 759, and 756 to entries 750, 760 and 755. If not detected, this error would cause the cells contained in blocks 765, 775 and 770 to be sent out over connection 0. A corruption in the linked list structures will render the queue engine useless since cells are no longer served in the desired order.

To detect errors of this type, one embodiment of the invention stores data indicating the connection of a cell along with the cell. Thus, blocks 775 and 770 which contain cells that belong to connection 1 would contain a connection indicator indicating connection 1. Prior to transmitting a cell, queue server 702 compares the connection data that is stored along with the cell against the connection on which the cell is to be sent. If the connection identified in the connection data does not match the connection on which the cell is to be sent, then queue server 702 generates an error signal and does not transmit the cell.

The error detection mechanism described above detects all errors that cause the linked list of one connection to become cross-linked with the linked list of another connection. Another type of error occurs when a link of an entry is changed to point to the wrong entry associated with the same connection. This type of error will typically result in dropping one or more blocks from the corresponding queue. For example, if entry 750 is changed to point to entry 754 rather than entry 753, then entries 753 and 759 will be dropped from the linked list associated with connection 0. Consequently, blocks 768 and 774 will be dropped from the queue for connection 0. After two cells are transmitted over connection 0, the linked list associated with connection 0 will be empty. However, the queue counter for connection 0 will indicate that the queue for connection 0 still includes two blocks. When service controller 620 attempts to service these two blocks, an error signal will be generated in response to an attempt to access an element of an empty list (see step 906 of FIG. 9).

Cell Information

After a cell has been received and stored in cell memory 622, service controller 620 may need to store information related to the cell. Such information may include, for example, the priority of the cell. However, the information for a cell may not be determined until many cell time periods after the cell is stored. For example, it may take a few cell time periods to determine that a cell is nonconforming and therefore should be marked as low priority. At that point in time, however, it would be inefficient to access cell memory 622 to store the "low priority" information along with the cell.

Rather than store the information with the cell, queue server 702 is configured to store the information in the entry in queue array 708 that corresponds to the block that is holding the cell. When a head pointer associated with a linked list is updated to place an entry at the head of the linked list, the block number and the cell information that is stored in the entry is copied into the head record. When the cell is transmitted, the information and the block number are retrieved from the head record. The transmitted cell is then processed using this information.

By storing in the queue array 708 information about cells, unnecessary accesses to cell memory are avoided. Furthermore, because the entries in queue array must be accessed when their corresponding cell is sent, no significant delay is caused by extracting information from the entries at that time.

Bad Block Queue

The larger the cell memory 622, the more likely the cell memory 622 will have one or more bad blocks. To ensure data integrity, such blocks should not be used to store cells. However, rather than throwing out an entire cell memory because of a few bad blocks, the queue controller 600 can be configured to simply avoid the bad blocks. Specifically, queue controller 600 may maintain a bad block queue, in addition to the free block queue and the various connection queues.

The bad block queue would be specified by linking the entries within queue array 708 that correspond to bad blocks. Preferably the bad block array would have its own head record in head array 704 and its own tail record in tail array 706. Under the assumption that a bad block will remain bad, the need for a head record can be avoided. However, it may be useful to maintain a head pointer so that a processor can easily determine which blocks are bad for debugging or repair purposes.

When queue server 702 transmits a cell, queue server 702 determines whether the source block that held the cell has gone bad. If the block has gone bad, queue server 702 adds the block to the bad block queue rather than the free list queue. Queue server 702 may also be configured to generate an error signal when the number of blocks in the bad block queue exceeds a predetermined threshold. Once the predetermined threshold has been exceeded, the cell memory 622 may be replaced.

Numerous specific embodiments have been described. According to one embodiment of the invention, the queue server includes a queue array for storing the plurality of linked lists. The queue array includes a plurality of entries. The plurality of entries includes one entry for each block of the plurality of blocks. The entries in the queue array are linked to reflect the order of the plurality of blocks in a plurality of queues. The plurality of queues includes a free block queue and a queue for each logical connection of the plurality of logical connections. The queue server furthermore includes a head array. The head array includes a corresponding record for each of the logical connections and a corresponding record for the free block queue.

For each of the logical connections, a pointer in the corresponding record in the head array points to the entry in the queue array that corresponds to the block that is at the head of the queue for the connection. A pointer in the corresponding record in the head array for the free block queue points to the entry in the queue array that corresponds to the block that is at the head of the free block queue.

The queue server also includes a tail array. The tail array includes a corresponding record for each of the logical connections and a corresponding record for the free block queue. For each of the logical connections, a pointer in the corresponding record in the tail array points to the entry in the queue array that corresponds to the block that is at the tail of the queue for the connection. A pointer in the corresponding record in the tail array for the free block queue points to the entry in the queue array that corresponds to the block that is at the tail of the free block queue.

According to another aspect to the invention, the plurality of linked lists contained in the queue server includes a linked list corresponding to a queue of bad blocks. The queue controller is furthermore configured to determine whether a block of the plurality of blocks is a bad block. If the block is a bad block, then the queue controller updates the plurality of linked lists to remove the bad block from any queues and updates the linked list corresponding to the queue of bad blocks to add the bad block to the queue of bad blocks.

According to another aspect of the invention, the queue server includes a counter for tracking the size of the queue of bad blocks, and generates an error signal when the size of the queue of bad blocks exceeds a predetermined threshold.

According to another aspect of the invention, the plurality of linked lists contained in the queue server includes a free block linked list corresponding to a free block queue. The queue controller is furthermore configured to identify the selected block by inspecting the free block linked list to determine a block at the head of the free block queue, and to update the free block linked list to remove the selected block from the head of the free block queue responsive to placing the data element in the selected block. The queue controller is furthermore configured to update the free block linked list to add the source block to the tail of the free block queue responsive to transmitting the data element that is stored in the source block.

According to another aspect of the invention, the queue server furthermore includes a plurality of empty flags. The plurality of empty flags include an empty flag for each of the logical connections and an empty flag for the free block linked list. The queue controller updates the linked list associated with the specified connection to reflect that the source block is no longer at the head of the queue that corresponds to the specified connection. The queue controller performs this by determining whether the source block is the last block in the queue that corresponds to the specified connection and setting the empty flag for the specified connection if the source block is the last block in the queue that corresponds to the specified connection.

The queue controller updates the free block linked list to remove the selected block from the head of the free block queue. The queue controller performs this by determining whether the selected block is the last block in the free block queue, and setting the empty flag for the free block linked list if the selected block is the last block in the free block queue.

The queue controller inspects the empty flag for the specified connection prior to determining the block in the memory that is at the head of a queue that corresponds with the specified connection, and generates an error signal if the empty flag for the specified connection indicates that the linked list associated with the specified connection is empty. Similarly, the queue controller inspects the empty flag for the free block linked list prior to inspecting the free block linked list to determine the block at the head of the free block queue, and generates an error signal if the empty flag for the free block linked list indicates that the free block linked list is empty.

The queue controller receives information about the data element after the data element has been stored in the selected block, and stores the information about the data element in an entry that corresponds to the selected block. The entry that corresponds to the selected block resides in the linked list that corresponds to the source connection.

According to yet another aspect of the invention, the queue controller stores in the selected block, along with the data element, a connection indicator that identifies the source connection. The queue controller detects whether the linked list corresponding to the designated connection has become corrupted, prior to transmitting the data element in the source block on the designated connection, by retrieving a connection indicator from the source block. The connection indicator indicates a particular connection of the plurality of logical connections. The queue controller compares the particular connection with the designated connection. If the particular connection is the same as the designated connection, then the data element is transmitted on the designated connection. If the particular connection is not the same as the designated connection, then an error signal is generated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for buffering digital information comprising:
   A) establishing a plurality of linked lists including a linked list for each queue of a plurality of queues;
   B) storing a data element that arrives on one of a plurality of logical connections by performing the steps of
      B1) determining a destination queue for the data element, said destination queue being one of said plurality of queues and being the queue corresponding to the logical connection on which said data element arrives;
      B2) placing the data element in a selected block in a memory corresponding to said destination queue;
      B3) updating the linked list that corresponds to the destination queue to reflect that the selected block is a last block in the destination queue; and
   transmitting information from a specified queue, said specified queue having a head, the step of transmitting including the steps of:
   inspecting a linked list of said plurality of linked lists that corresponds to said specified queue to determine a source block in said memory, wherein the source block is a block at the head of the specified queue;
   transmitting a data element that is stored in the source block; and
   updating the linked list associated with the specified queue to reflect that the source block is no longer at the head of the specified queue.

2. A method for buffering digital information comprising:
   A) establishing a plurality of linked lists including a linked list for each queue of a plurality of queues, the plurality of linked lists including a linked list corresponding to a queue of bad blocks of a memory that includes a plurality of blocks;
   B) storing a data element that arrives on one of a plurality of logical connections by performing the steps of
      B1) determining a destination queue for the data element, said destination queue being one of said plurality of queues and being the queue corresponding to the logical connection on which said data element arrives,
      B2) placing the data element in a selected block in the memory corresponding to said destination queue,
      B3) updating the linked list that corresponds to the destination queue to reflect that the selected block is a last block in the destination queue;
   determining whether a block of said plurality of blocks is a bad block; and if the block is a bad block, then
   updating said plurality of linked lists to remove the bad block from any queues, and
   updating the linked list corresponding to the queue of bad blocks to add the bad block to the queue of bad blocks.

3. The method of claim 1 wherein:
   the step of A) establishing a plurality of linked lists includes the step of establishing a free block linked list corresponding to a free block queue;

the method further comprises the steps of
- identifying the selected block by inspecting the free block linked list to determine a block at the head of the free block queue; and
- updating the free block linked list to remove the selected block from the head of the free block queue responsive to placing the data element in the selected block.

4. The method of claim 2 wherein said free block queue has a tail, the method further comprising the step of updating the free block linked list to add the source block to the tail of the free block queue responsive to transmitting the data element that is stored in the source block.

5. The method of claim 2 further comprising the steps of establishing a plurality of empty flags, wherein said plurality of empty flags include an empty flag for each queue of said plurality of queues and an empty flag for the free block linked list;

wherein the step of updating the linked list associated with the specified queue to reflect that the source block is no longer at the head of the specified queue includes the steps of
- determining whether the source block is the last block in the specified queue; and
- setting the empty flag for the specified queue if the source block is the last block in the specified queue;

wherein the step of updating the free block linked list to remove the selected block from the head of the free block queue includes the steps of
- determining whether the selected block is the last block in the free block queue; and
- setting the empty flag for the free block linked list if the selected block is the last block in the free block queue.

6. The method of claim 5 further comprising the steps of inspecting the empty flag for the specified queue prior to determining the block in the memory that is at the head of the specified queue;

maintaining a queue depth counter that holds a value indicating how many blocks are in the specified queue; and generating an error signal if the empty flag for the specified queue indicates that the linked list associated with the specified queue is empty and the queue depth counter is non-zero.

7. The method of claim 5 further comprising the steps of inspecting the empty flag for the free block linked list prior to inspecting the free block linked list to determine the block at the head of the free block queue;

maintaining a queue depth counter that holds a value indicating how many blocks are in the free block queue; and generating an error signal if the empty flag for the free block linked list indicates that the free block linked list is empty and the value in the queue depth counter is non-zero.

8. The method of claim 1 further comprising the steps of:

generating information about the data element after storing the data element in the selected block; and storing the information about the data element in an entry that corresponds to the selected block, wherein the entry that corresponds to the selected block resides in the linked list that corresponds to the destination queue.

9. The method of claim 8 further comprising the steps of tracking a size of the queue of bad blocks; and generating an error signal when the size of the queue of bad blocks exceeds a predetermined threshold.

10. The method of claim 2 further comprising the steps of:

storing in the selected block along with the data element a queue indicator that indicates the destination queue;

prior to transmitting the data element in the source block, performing the steps of
- retrieving a queue indicator from the source block, wherein the queue indicator indicates a particular queue of the plurality of queues;
- comparing the particular queue with the specified queue;
- if the particular queue is the same as the specified queue, then transmitting the data element;
- if the particular queue is not the same as the specified queue, then generating an error signal.

11. The method of claim 1 wherein:

each logical connection of said plurality of logical connections corresponds to a queue of said plurality of queues; and said step determining a destination queue comprises determining which queue of said plurality of queues corresponds to the connection on which said data element arrives.

12. The method of claim 1 further comprising performing the following steps after transmitting said data element:

determining whether a newly arrived data element needs to be stored;

if no newly arrived data element needs to be stored, then updating a linked list associated with a free block queue to reflect that the source block is at the back of the free block queue; and if a newly arrived data element needs to be stored, storing said newly arrived data element in said source block; and updating a linked list associated with one of said plurality of queues to reflect that the source block is at the back of said one of said plurality of queues.

13. The method of claim 1 further comprising the step of repeating steps A) and B) for a plurality of data elements, wherein said data elements are ATM calls having a fixed size.

14. A method for buffering digital information, the method comprising the steps of:

A) establishing a plurality of linked lists including a linked list for each queue of a plurality of queues;

B) storing a data element that arrives on one of a plurality of logical connections by performing the steps of
- B1) determining a destination queue for the data element,
- B2) placing the data element in a selected block in a memory,
- B3) updating the linked list that corresponds to the destination queue to reflect that the selected block is a last block in the destination queue;

wherein the step of A) establishing a plurality of linked lists further comprises the steps of establishing a free block linked list for a free block queue;

providing a queue array comprising a plurality of entries, wherein the plurality of entries includes one entry for each block of said plurality of blocks;

linking the entries in the queue array to reflect the order of said plurality of blocks in said plurality of queues;

providing a head array, wherein the head array includes a corresponding record for each queue of the plurality of queues and a corresponding record for the free block queue;

for each queue of the plurality of queues, causing a pointer in the corresponding record in the head array to point to the entry in the queue array that corresponds to the block of said plurality of blocks that is at the head of the queue;

causing a pointer in the corresponding record in the head array for the free block queue to point to the entry in the queue array that corresponds to the block of said plurality of blocks that is at the head of the free block queue;

providing a tail array, wherein the tail array includes a corresponding record for each queue of the plurality of queues and a corresponding record for the free block queue;

for each queue of the plurality of queues, causing a pointer in the corresponding record in the tail array to point to the entry in the queue array that corresponds to the block of said plurality of blocks that is at the tail of the queue; and causing a pointer in the corresponding record in the tail array for the free block queue to point to the entry in the queue array that corresponds to the block of said plurality of blocks that is at the tail of the free block queue.

15. An apparatus for buffering digital information, wherein the information includes a plurality of data elements, the apparatus comprising:

a memory comprising a plurality of blocks;

a queue server that contains a plurality of linked lists, wherein said plurality of linked lists includes a linked list for each queue of a plurality of queues;

a queue controller that is configured to store each data element of the plurality of data elements by
determining a destination queue for the data element;
placing the data element in a selected block in said memory;
updating the linked list of said plurality of linked lists that corresponds to the destination queue to reflect that the selected block is the last block in the destination queue;

wherein the queue controller is further configured to receive of a signal requesting transmission of information from a specified queue, and to transmit a data element from the specified queue by
inspecting the linked list of said plurality of linked lists that corresponds to the specified queue to determine a source block of said plurality of blocks, wherein the source block is a block at the head of the specified queue;
transmitting a data element that is stored in the source block; and
updating the linked list associated with the specified queue to reflect that the source block is no longer at the head of the specified queue.

16. The apparatus of claim 15 wherein:

the plurality of linked lists contained in the queue server includes a linked list corresponding to a queue of bad blocks; and the queue controller is further configured to determine whether a block of said plurality of blocks is a bad block, and if the block is a bad block, then to update said plurality of linked lists to remove the bad block from any queues, and update the linked list corresponding to the queue of bad blocks to add the bad block to the queue of bad blocks.

17. The apparatus of claim 15 wherein:

the plurality of linked lists contained in the queue server includes a free block linked list corresponding to a free block queue; and the queue controller is further configured to
identify the selected block by inspecting the free block linked list to determine a block at the head of the free block queue; and
update the free block linked list to remove the selected block from the head of the free block queue responsive to placing the data element in the selected block.

18. The apparatus of claim 17 wherein the queue controller is further configured to update the free block linked list to add the source block to the tail of the free block queue responsive to transmitting the data element that is stored in the source block.

19. The apparatus of claim 18 wherein:

the queue server further comprises a plurality of empty flags, wherein said plurality of empty flags include an empty flag for each queue of said plurality of queues and an empty flag for the free block linked list;

wherein the queue controller is configured to update the linked list associated with the specified queue to reflect that the source block is no longer at the head of the specified queue by
determining whether the source block is the last block in the specified queue; and
setting the empty flag for the specified queue if the source block is the last block in the specified queue;

wherein the queue controller is configured to update the free block linked list to remove the selected block from the head of the free block queue by
determining whether the selected block is the last block in the free block queue; and
setting the empty flag for the free block linked list if the selected block is the last block in the free block queue.

20. The apparatus of claim 19 wherein the queue controller is further configured to inspect the empty flag for the specified queue prior to determining the block in the memory that is at the head of the specified queue; and generate an error signal if the empty flag for the specified queue indicates that the linked list associated with the specified queue is empty.

21. The apparatus of claim 19 wherein the queue controller is configured to inspect the empty flag for the free block linked list prior to inspecting the free block linked list to determine the block at the head of the free block queue; and generate an error signal if the empty flag for the free block linked list indicates that the free block linked list is empty.

22. The apparatus of claim 15 wherein the queue controller is configured to:

receive information about the data element after the data element has been stored in the selected block; and store the information about the data element in an entry that corresponds to the selected block, wherein the entry that corresponds to the block resides in the linked list that corresponds to the destination queue.

23. The apparatus of claim 16 wherein:

the queue server includes a counter for tracking the size of the queue of bad blocks; and wherein the queue controller is configured to generate an error signal when the size of the queue of bad blocks exceeds a predetermined threshold.

24. The apparatus of claim 15 wherein:

the plurality of linked lists in the queue server includes a free block linked list for a free block queue;

the queue server further includes a queue array for storing said plurality of linked lists;

the queue array comprises a plurality of entries, wherein the plurality of entries includes one entry for each block of said plurality of blocks;

the entries in the queue array are linked to reflect the order of said plurality of blocks in said plurality of queues, wherein said plurality of queues includes said free block queue;

the queue server further includes a head array, wherein the head array includes a corresponding record for each queue of the plurality of queues and a corresponding record for the free block queue;

for each queue of the plurality of queues, a pointer in the corresponding record in the head array points to the entry in the queue array that corresponds to the block of said plurality of blocks that is at the head of the queue;

a pointer in the corresponding record in the head array for the free block queue points to the entry in the queue array that corresponds to the block of said plurality of blocks that is at the head of the free block queue;

the queue server further includes a tail array, wherein the tail array includes a corresponding record for each queue of the plurality of queues and a corresponding record for the free block queue;

for each queue of the plurality of queues, a pointer in the corresponding record in the tail array points to the entry in the queue array that corresponds to the block of said plurality of blocks that is at the tail of the queue; and a pointer in the corresponding record in the tail array for the free block queue points to the entry in the queue array that corresponds to the block of said plurality of blocks that is at the tail of the free block queue.

25. The apparatus of claim 15 wherein the queue controller is configured to store in the selected block along with the data element a queue indicator that indicates the destination queue; and detect whether the linked list corresponding to the specified queue has become corrupted, prior to transmitting the data element in the source block on said specified queue, by retrieving a queue indicator from the source block, wherein the queue indicator indicates a particular queue of the plurality of queues;

comparing the particular queue with the specified queue;

if the particular queue is the same as the specified queue, then transmitting the data element on the specified queue;

if the particular queue is not the same as the specified queue, then generating an error signal.

26. The apparatus of claim 25 wherein:

said data element arrives on a particular connection of a plurality of logical connections;

each of said plurality of logical connections has a corresponding queue of said plurality of queues;

said queue indicator that indicates the destination queue comprises a connection indicator that identifies said particular connection.

* * * * *